United States Patent [19]

Gourley et al.

[11] Patent Number: 5,484,202
[45] Date of Patent: Jan. 16, 1996

[54] AEROSOL CONTAINMENT SYSTEM

[75] Inventors: Glenn R. Gourley; Bill L. Kreamer, both of Madison, Wis.

[73] Assignee: Wisconsin Alumni Research Foundation, Madison, Wis.

[21] Appl. No.: 382,492

[22] Filed: Feb. 1, 1995

[51] Int. Cl.$^6$ ...................................................... B01F 11/00
[52] U.S. Cl. ........................... 366/120; 366/139; 366/600
[58] Field of Search ..................................... 366/108, 114, 366/116, 117, 118, 120, 127, 600, 139; 422/50, 224, 225; 134/184; 68/355

[56] References Cited

U.S. PATENT DOCUMENTS

| | | | |
|---|---|---|---|
| 2,961,302 | 11/1960 | Sanz | 366/117 |
| 3,351,539 | 11/1967 | Branson | 204/14 |
| 3,614,069 | 10/1971 | Murry | 259/1 |
| 3,743,523 | 7/1973 | Bodine | 99/217 |
| 4,483,571 | 11/1984 | Mishiro | 68/355 |
| 4,571,087 | 2/1986 | Ranney | 366/108 |
| 4,602,184 | 7/1986 | Meitzler | 366/118 |
| 4,941,134 | 7/1990 | Nyberg et al. | 367/142 |
| 4,990,082 | 2/1991 | Lee | 425/456 |

OTHER PUBLICATIONS

"Sonicator®", Heat Systems—Ultarsonics, Inc., 1987.

*Primary Examiner*—Robert W. Jenkins
*Attorney, Agent, or Firm*—Andrus, Sceales, Starke & Sawall

[57] ABSTRACT

A sonicator apparatus having a signal generator for generating high frequency sound waves to a convertor which transforms electrical energy into mechanical energy in the form of oscillations to a horn having a probe immersed in a sample disposed in a sample holder includes a shielding arrangement having one end sealed against the convertor and another end sealed against the sample container and defining an aerosol containment chamber for preventing aerosols generated by oscillation of the probe in the sample from becoming airborne. The apparatus further includes a self centering device to insure proper disposition of the probe relative to the sample holder and use of a partial vacuum to provide a more efficient evacuation of aerosols from the chamber and simultaneously diminish noise levels. An enclosure provided with sound absorbing foam enhances the reduction of noise.

21 Claims, 5 Drawing Sheets

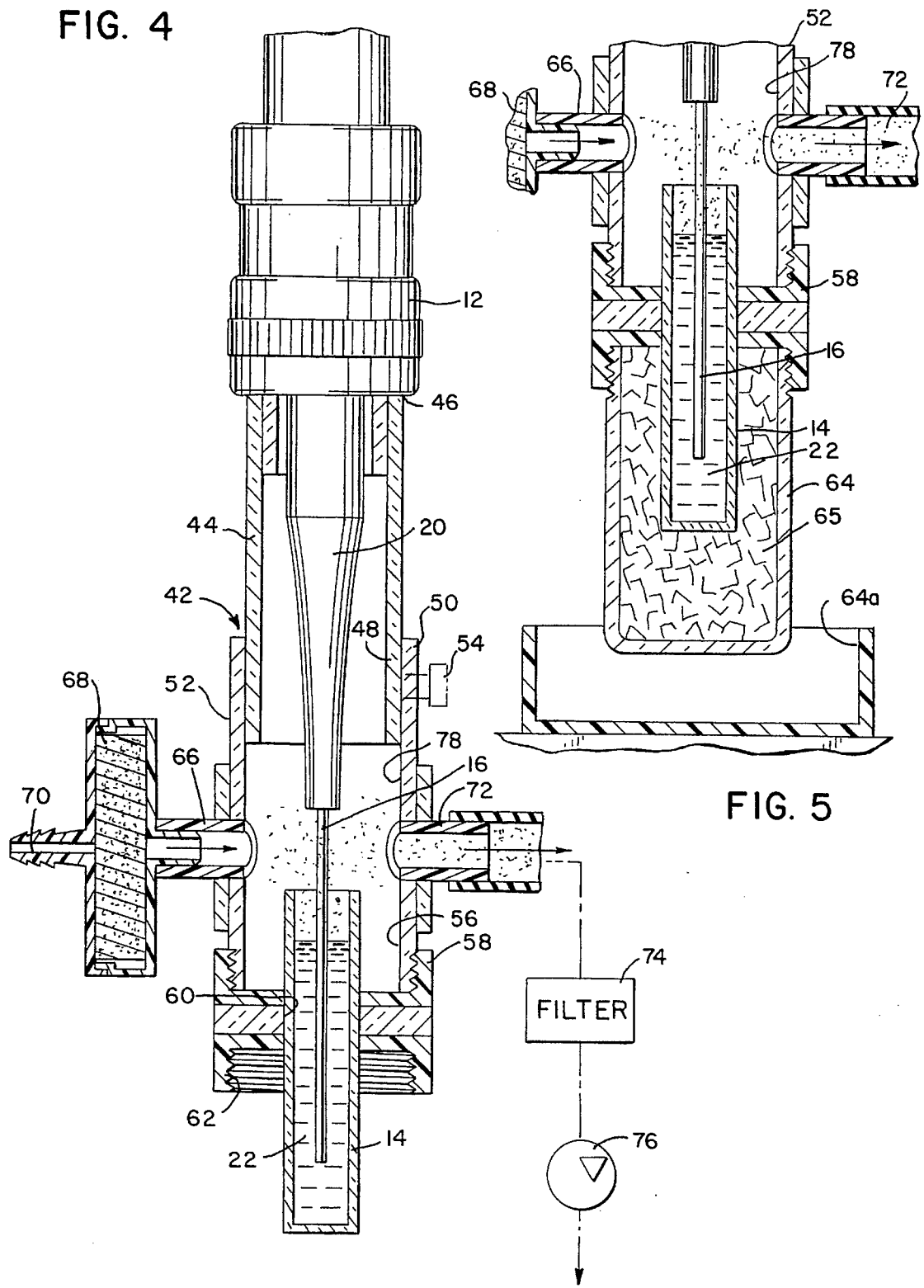

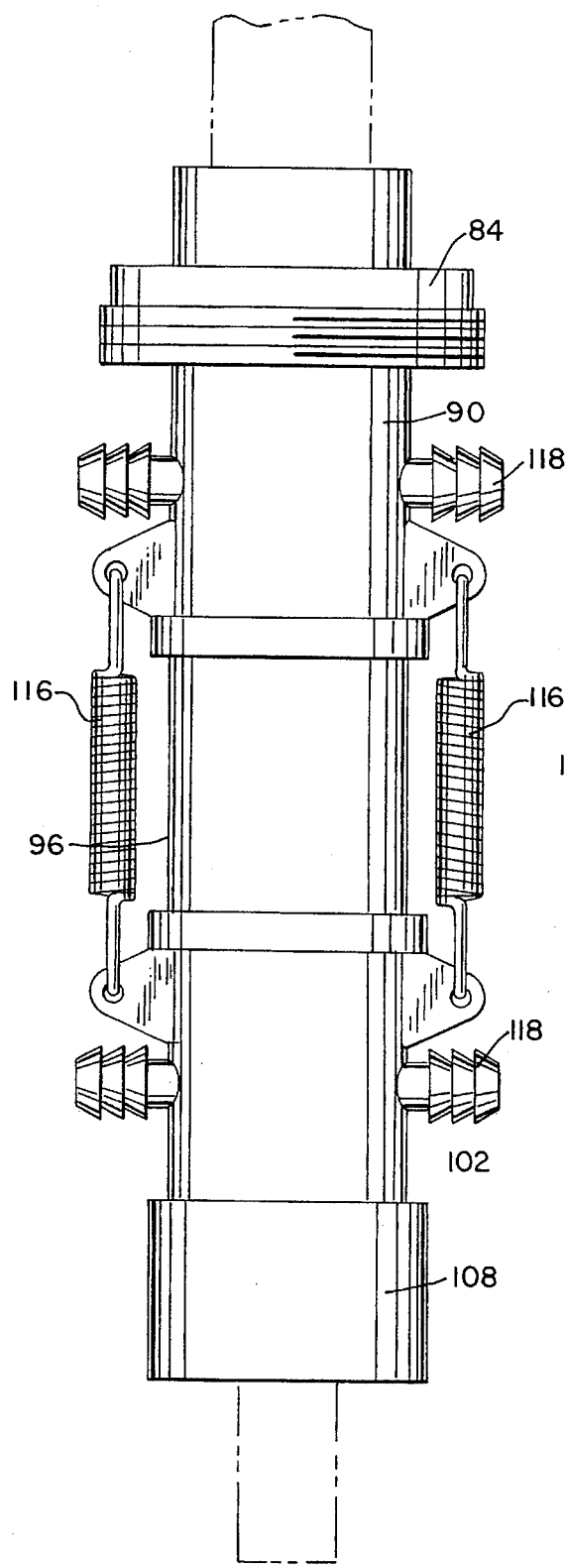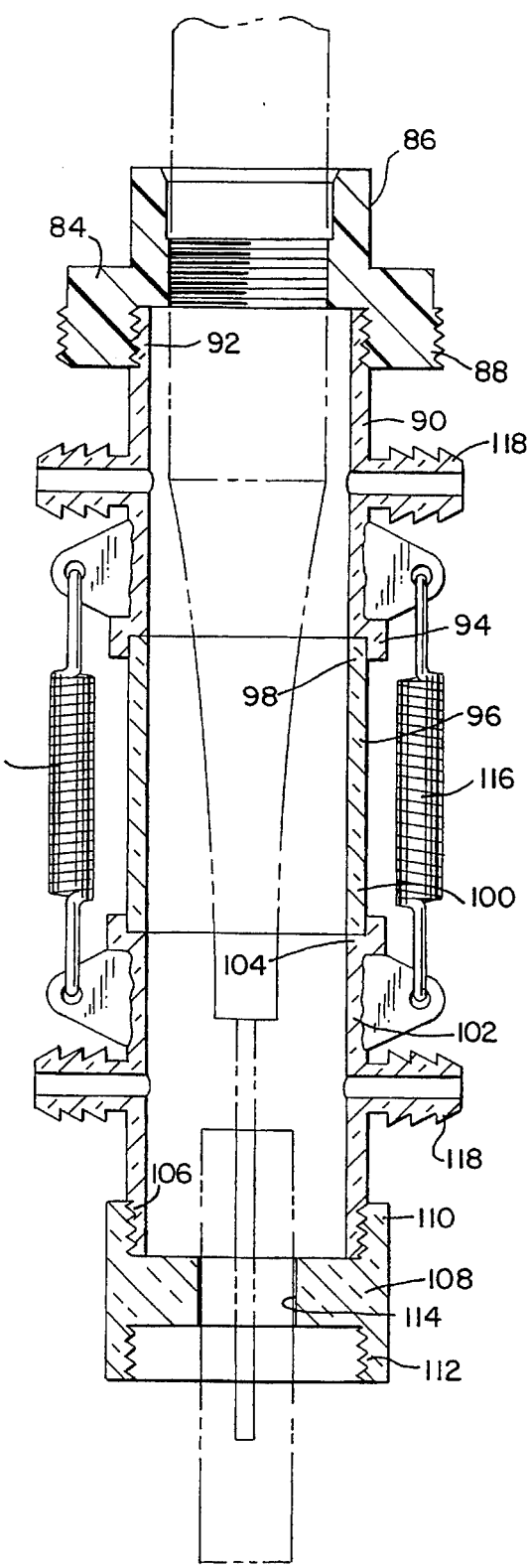

AEROSOL CONTAINMENT SYSTEM

TECHNICAL BACKGROUND AND FIELD OF THE INVENTION

This invention relates generally to ultrasonic processing of laboratory samples and, more particularly, pertains to improved sonication of samples wherein high frequency sound waves are utilized to disrupt cells in laboratory samples by vibration of a probe immersed in the sample.

It is well known to use sonicators for liquid processing, cell disruption, homogenization and emulsification of samples disposed in a test tube, beaker or the like. Such sonicators are commonly applied in manufacturing of chemicals, sonochemistry, biotechnology, preparing lipids and breaking polymers. Prior art sonicators include a signal generator for providing high voltage pulses of energy at typical frequency levels of 20 kHz. Electrical energy is transformed into mechanical energy in the form of oscillations delivered via a transducer (convertor) to a horn having an elongated probe or extender tip which is directly immersed in a sample held within a sample container such as a test tube or beaker.

In the course of using such arrangement, probes must be carefully guided by hand into test tubes and held such that the vibrating probe will not contact the sides of the test tube. In addition, each time a sample is to be processed, the sonicator must be sterilized before it is inserted into the sample in the test tube or beaker. Non-disposable sonicators are often used on bacteria which are grown with vectors to produce certain products. These bacterial cells are then disrupted to retrieve the products. Other sonicators are used on HIV infected cells, cells affected with hepatitis, etc. with the result that virulent aerosols are generated by the oscillation of the probe immersed within the sample and become airborne, contaminating the surrounding environment and placing the health of laboratory personnel at risk. In addition, the high frequency sound waves produce harmonics on the surface of the sample which result in disturbingly high noise levels. While some attempts have been made by the prior art to design sonicators which utilize fluids as an energy transmission medium and cup horns to provide ultrasonic processing without probe insertion to reduce aerosoling, there remains a need for addressing a solution which will provide a sonicator having disposable elements which reduce aerosoling, provide better noise abatement and enable self centering of the probe in each sample. Likewise, while it is known to use an acoustic enclosure for reducing continuous processing noise, it is desirable to enhance the design of a cabinet used to enclose sonication apparatus to further increase noise abatement.

SUMMARY OF THE INVENTION

The improved ultrasonic processing apparatus advantageously provides an enhanced shielding arrangement for preventing aerosols from becoming airborne and application of a partial vacuum along with fortification of an enclosure to efficiently reduce noise caused by acoustic energy harmonics. The apparatus provides a self centering device for preventing contact of a probe with the sample container.

These and other aspects of the invention are realized in an ultrasonic apparatus having a signal generator for generating high frequency sound waves to a convertor which transforms electrical energy to mechanical energy in the form of oscillations to a horn having a probe immersed in a sample disposed in a sample container. A shielding arrangement having one end sealed against the horn and another end sealed against the sample container defines an enclosed aerosol containment chamber for preventing aerosols generated by the oscillation of the probe in the sample from becoming airborne.

The invention further contemplates an ultrasonic apparatus having a signal generator for generating high frequency sound waves to a convertor which transforms electrical energy into mechanical energy in the form of oscillations to a horn having a probe immersed in a sample disposed in a sample holder wherein there is provided a cabinet enclosing the convertor, the horn and the probe. The cabinet includes an inner chamber lined with sound absorbing foam and has a front observation panel comprised of a layered plexiglass assembly for abatement of noise generated by the oscillation of the probe in said sample.

The invention also contemplates an ultrasonic apparatus for generating high frequency sound waves to a convertor which transforms electrical energy into mechanical energy in the form of oscillations to a horn having a probe immersed in a sample disposed in a sample container and including a shielding arrangement having one end sealed against the horn and having another end sealed against and in sliding relationship with the sample container. The other end is formed with a passageway having a longitudinal axis coincidental with the longitudinal axes of the sample container and the probe such that the other end defines a self centering device with a sample container as it slides in the other end.

BRIEF DESCRIPTION OF THE DRAWINGS

The invention will become better understood by reference to the following detailed description of the preferred exemplary embodiment when read in conjunction with the appended drawing wherein like numerals denote like elements.

FIG. 4 is a cross-sectional view taken on line 4—4 of FIG. 3 with a sample container in place;

FIG. 5 is a fragmentary view of the apparatus shown in FIG. 4 with the sample container immersed in an ice bath;

FIGS. 9 and 10 are alternative embodiments showing a different structure for providing the aerosol containment and noise abatement apparatus.

DETAILED DESCRIPTION OF THE PREFERRED EMBODIMENTS

Figure 1:
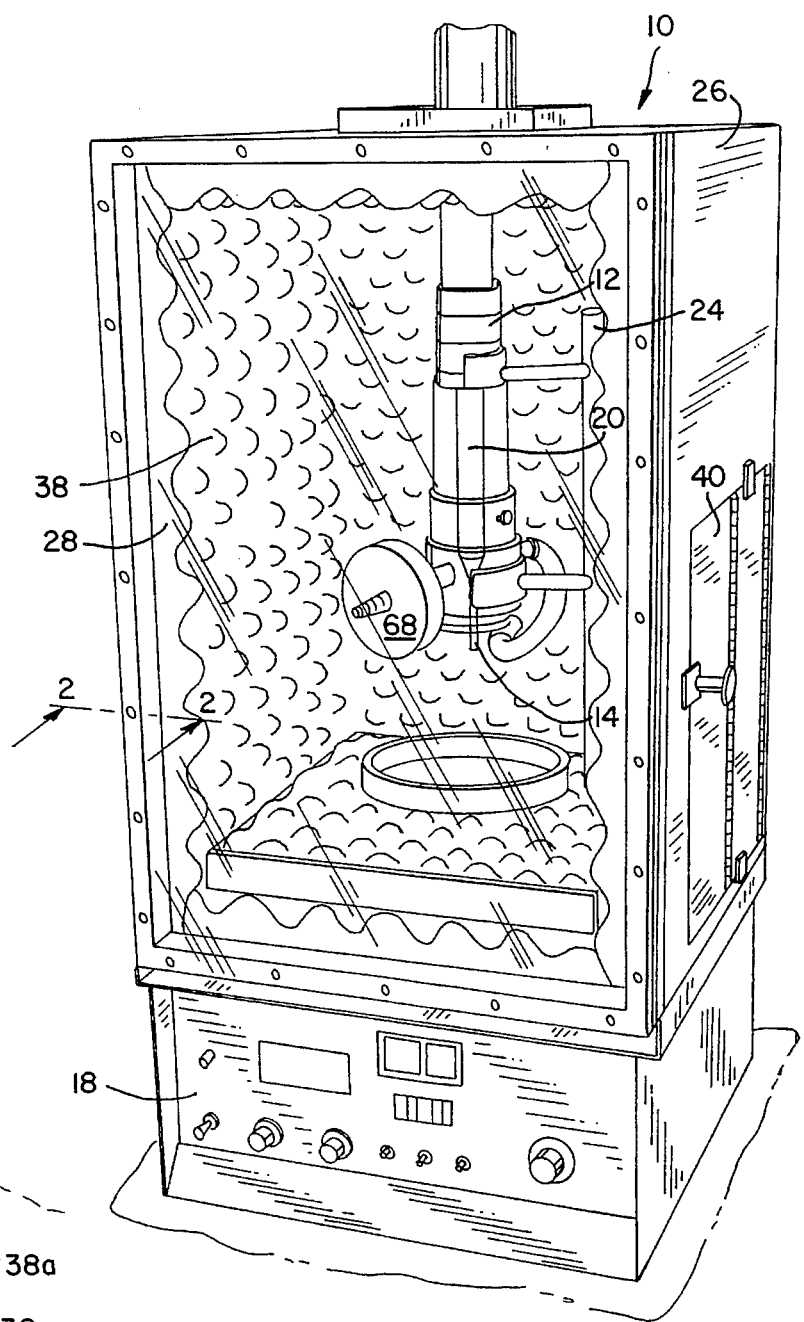
FIG. 1 is a perspective view of a sonication apparatus in accordance with the present invention showing the cabinet, sonic energy producing device and aerosol containment and noise abatement apparatus.
Figure 2:
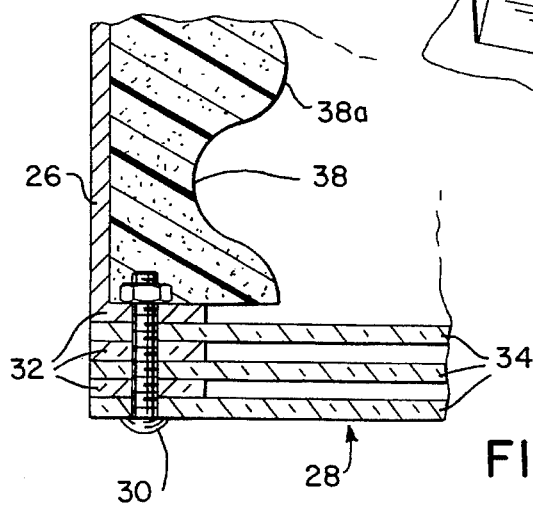
FIG. 2 is a cross-sectional view taken on line 2—2 of FIG. 1.

Referring now to FIGS. 1–4, there is shown a sonication apparatus 10 in accordance with the present invention. Apparatus 10 provides for ultrasonic processing to disrupt cells by inducing high frequency sound waves into samples through a (convertor) transducer 12. In the embodiment shown, the sample is contained in a generally narrow diameter test tube 14 (or beaker) and the sonication is accomplished by means of producing a shaped sonic energy field directed along a propagation path and through an energy transmission medium such as a solid probe 16 or extender tip immersed in the narrow diameter test tube or beaker.

In the preferred embodiment, apparatus 10 is used in conjunction with pediatrics research, where among other things, it is desired to prepare an emulsion down to 1/100 of a micron, homogenize immersible liquids, and make fine suspensions even finer and solubilize difficult compounds. However, the present invention is equally applicable in the areas of sonochemistry and biotechnology within university, government, clinical and industrial environments.

In the embodiment shown, the sonic energy field is produced by an ultrasonic processor comprising a signal generator 18 which provides high voltage pulses of energy and adjusts for varying load conditions such as temperature and viscosity. The signal generator 18 senses impedance change and increases or decreases power to the probe 16 automatically. Connected to signal generator 18 is a convertor 12 which transforms electrical energy to mechanical energy via a horn 20 and probe 16 which radiates energy into the liquid sample 22 being treated. The ultrasonic processor is preferably the Model 385 SONICATOR DISRUPTOR manufactured by Heat Systems - Ultrasonics, Inc. of Plainview, N.Y. The convertor, horn and probe are normally mounted for support by a stand 24 which, in turn, may be located within an enclosure 26.

At the outset, it should be understood that with existing sonicators, when a probe or extended tip is inserted into a sample container such as a test tube, beaker or jar, the high frequency sound waves produce aerosols and the harmonics emanating from the sample surface causes continuous processing noise. While some attempts have been made to control aerosoling in sonicators without probe insertion into the sample and to reduce noise levels by positioning certain components of the sonicator in acoustic enclosures, the present invention contemplates a specific structure to be described below which more efficiently prevents aerosols from becoming airborne and simultaneously provides further noise abatement. In addition, while prior art sonicators require careful positioning of the probe within the sample container, the present invention provides a self centering of the probe within its sample container. The unique mounting relationship of the sample container Within a sample holder also allows the probe to be inserted at various depth levels of the sample without concern that the vibrating probe will contact the sides of the sample container.

In accordance with the present invention, enclosure 26 has a front observation panel 28 (FIG. 2) formed of a plexiglass/air/plexiglass/air/plexiglass sandwich held together by a fastener 30 and spacers 32 which enable each plexiglass layer 34 to be spaced equidistantly from one another. With the exception of panel 28, each of the inner surfaces 36 of enclosure 26 is provided with sound absorbing foam 38 having a series of protrusions 38a extending inwardly into the interior of enclosure 26. Two hinged side doors 40 provide access to the interior of enclosure 26.

Figures 3, 7:
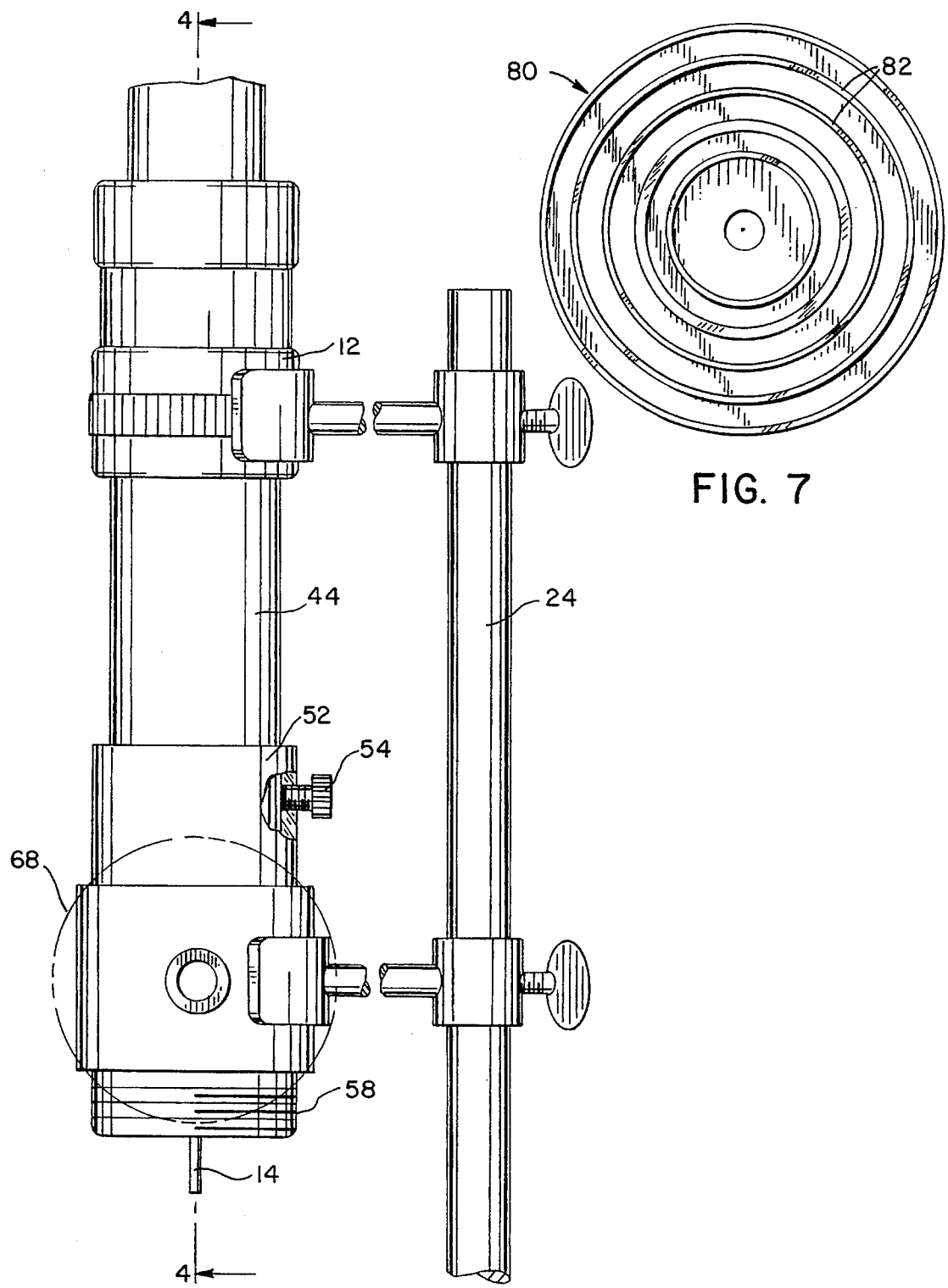
FIG. 3 is an enlarged elevational view of the aerosol containment and noise abatement apparatus without a sample container in place.
FIG. 7 is a cross-sectional view taken on line 7—7 of FIG. 6.
Figure 6:
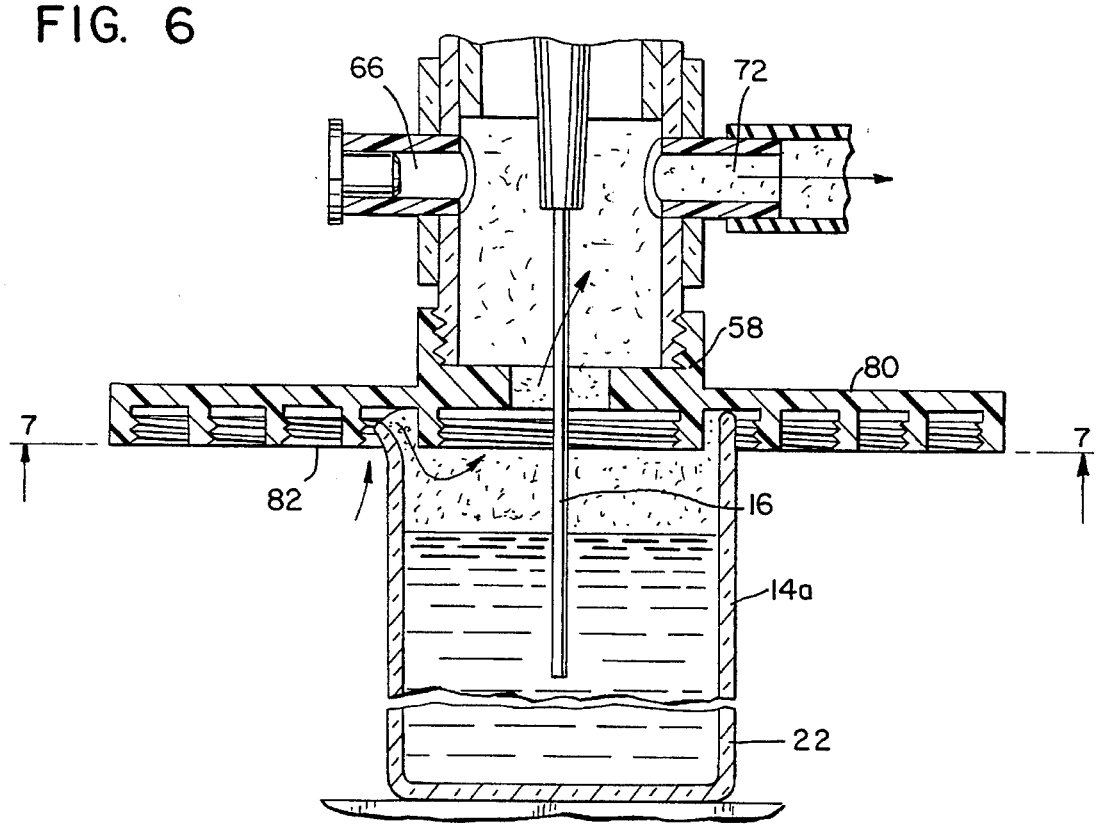
FIG. 6 is a fragmentary cross-sectional view of the apparatus shown in FIG. 4 with the sample contained in a beaker adapted to the apparatus by a jar attachment.
Figure 8:
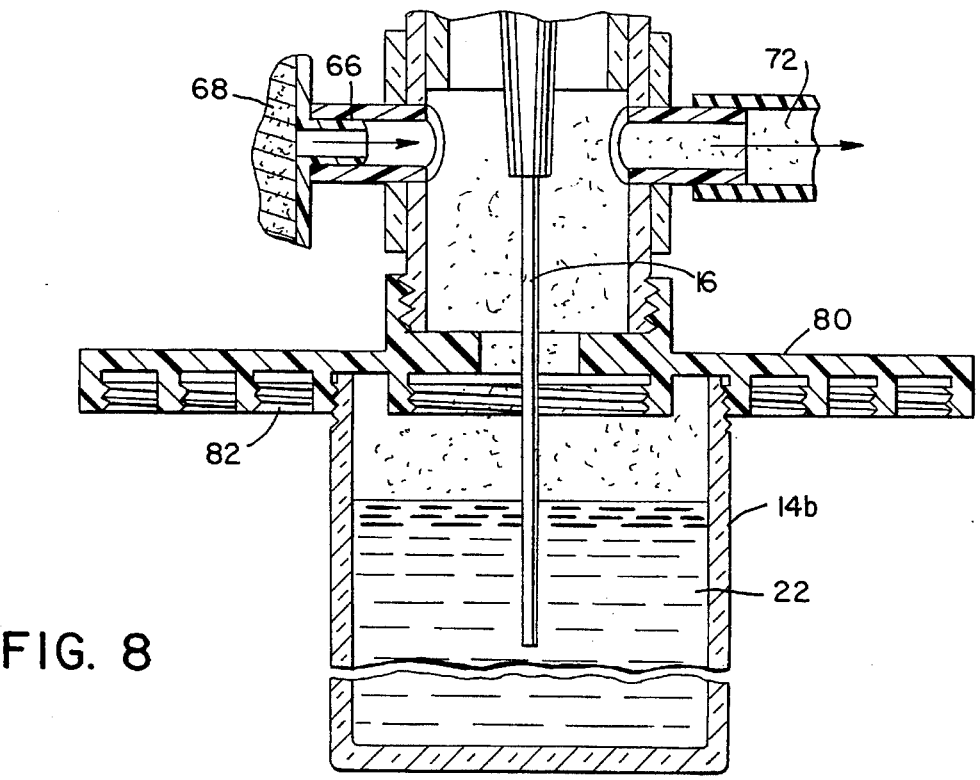
FIG. 8 is a view similar to FIG. 6 with a different sized beaker adapted to the jar attachment.

As best seen in FIGS. 3 and 4, sonication apparatus 10 includes an adjustable shielding arrangement 42 for preventing aerosols generated by the oscillation of probe 16 within sample 22 from becoming airborne. Shielding arrangement 42 comprises a first cylindrically shaped section 44 having an upper end 46 sealed against coupler 84 which is sealed against the convertor 12 and a lower end 48 telescopically received in the upper end 50 of a second cylindrically shaped section 52. A set screw 54 acts as a retaining means for maintaining the position of second section 52 relative to first section 44. Screwthreadly attached to the lower end 56 of second section 52 is a sample holder 58 having formed therein a passageway 60 within which sample container 14 is slidably adjustable and in sealing engagement therewith. Passageway 60 has a longitudinal axis coincidental with the longitudinal axes of sample container 14 and probe 16 such that sample holder 58 defines a self centering device for sample container 14 as it slides in sample holder 58. The lower end 62 of sample holder 58 is provided with screwthreads for adapting a complementary beaker or jar 64 (FIGS. 5, 6 and 8). In some instances, it may be desirable to keep samples 22 in sample containers 14 cold by placing ice 65 or chilled water in jar 64. Condensation from jar 64 may be collected in a suitable container 64a.

As a salient feature of the invention, second section 52 is provided with an input port 66 and a first disposable hydrophobic filter 68 through which a source of air flows via a barbed hose connector 70. Second section 52 also includes an outlet port 72 connected downstream with a second disposable hydrophobic filter 74 which, in turn, is connected to a vacuum source 76.

By means of the structure recited above, shielding arrangement 42 defines an enclosed, sealed aerosol containment chamber 78 for preventing aerosols generated by the oscillation of probe 16 in sample 22 from becoming airborne and creating a contaminated area deleterious to the health of laboratory personnel in the area where apparatus 10 is located. It has also been discovered that by applying a partial vacuum to chamber 78, a negative pressure is created by which aerosols are more efficiently evacuated through filters 74 which are replaced after each sample 22 has been sonicated. The use of such partial vacuum also attenuates sound propagation so that apparatus 10 installed in insulated enclosure 26 provides a reliable noise abatement system.

Referring now to FIGS. 6–8, the present invention is designed to accommodate a variety of different sized sample containers other than test tube 14. In particular, a disc-like adapter 80 is provided to retain various sizes of beakers or jars 14a. Adapter 80 has an upper end provided with screwthreads for attachment to second section 52. The underside of adapter 80 has a series of threaded, concentric ring pairs 82 which act as baffles to draw air from the outside lip of beaker 14a to the center where it is drawn to vacuum source 76. When a beaker 14a is employed, as shown in FIG. 6, inlet filter 68 is removed and inlet port 66 closed. This increases the air drawn at the top of beaker 14a creating an air baffle to prevent the escape of aerosols from beaker 14a. If a jar 14b (FIG. 8) is used instead of beaker 14a, jar 14b is screwed into the appropriate threaded cap and an airtight connection is created. Inlet filter 68 is provided to insure a sweeping effect across the surface of sample 22 to remove any aerosols generated in the chamber 78.

In each structure described above, it is preconceived that first section 44 and second section 52 along with filters 68,74 will be manufactured out of a clear plastic material which affords the user a view of sample 22 and can be disposed of subsequent to ultrasonic processing. Without such shielding arrangement 42, prior art non-disposable sonicators are simply plunged into samples in sample containers in order to disrupt the cells of the sample. Because there is no centering provision, probes may vibrate errantly against the side surfaces of the sample containers. In addition, each time the prior art sonicator is used, it needs to be autoclaved (sterilized) and with no shielding arrangement on the viral aerosols, they become airborne, creating a health hazard. In the absence of an applied partial vacuum, noise abatement is only slightly diminished by using a non-insulated enclosure or cabinet.

Turning finally to FIGS. 9 and 10, there is shown an alternative embodiment of the invention wherein each of the components described hereafter is intended to be disposed of after each sample 22 is ultrasonically processed. In this case, shielding arrangement 42 comprises a threaded adapter 84 having an upper end 86 sealed against convertor 12 and a lower end 88 surrounding horn 20. A first adapter 90 has an upper end 92 connected to lower end 88 of threaded adapter 84 and a lower end having a flange 94. A spacer 96 has an upper end 98 frictionally fit within flange 94 and a lower end 100. A second adapter 102 (similar to first adapter 90 but disposed upside down) has an upper end 104 frictionally fit to lower end 100 of spacer 96 and a lower end 106. A sample holder 108 has an upper end 110 connected to lower end 106 of second adapter 102 and a lower end 112 formed with a passageway 114. First adapter 90 and second adapter 102 are retained in position on either end of spacer 96 by springs 116 extending between lower end 94 of first adapter 90 and upper end 104 of second adapter 102. Suitable barbed hose connectors 118 are provided on adapters 90,102 which serve as inlet and outlet ports, respectively, for the purpose of evacuating the formed aerosol containment chamber 78 as before described.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with the following claims. In particular while the invention has been described in terms of use in sonication, it should be appreciated that the invention is also suited to use with mechanical homogenizers.

We claim:

1. In an ultrasonic apparatus having a signal generator for generating high frequency sound waves to a convertor which transforms electrical energy to mechanical energy in the form of oscillations to a horn having a probe immersed in a sample disposed in a sample container, the combination comprising:

a shielding arrangement having one end sealed against said horn and another end sealed against said sample container, said shielding arrangement defining an enclosed aerosol containment chamber for preventing aerosols generated by the oscillation of said probe in said sample from becoming airborne.

2. The combination of claim 1, wherein said shielding arrangement comprises a first section having one end sealed against said convertor, and a second section having one end sealed against said sample container, said first section and said second section being in telescopic engagement with each other.

3. The combination of claim 2, wherein said second section includes a sample holder in sliding relationship with said sample container.

4. The combination of claim 2, including retaining means for maintaining the position of said second section relative to said first section.

5. The combination of claim 2, wherein said second section includes adapter means for holding various sizes of said sample container.

6. The combination of claim 1, including means for evacuating the aerosols from said aerosol containment chamber.

7. The combination of claim 6, wherein said means for evacuating said aerosol containment chamber includes disposable filtering means.

8. The combination of claim 1, wherein said sample container is a test tube.

9. The combination of claim 1, wherein said sample container is a beaker.

10. The combination of claim 1, wherein said sample container is a beaker filled with ice.

11. The combination of claim 10, wherein said adapter means is a disc-like element having one end removably attached to said second section and having another end provided with a series of concentric rib pairs, each of said pairs being engageable with one of said sample containers.

12. The combination of claim 1, wherein said shielding arrangement has an input port provided with a first filter.

13. The combination of claim 1, wherein said shielding arrangement has an output port provided with a second filter.

14. The combination of claim 1, including a vacuum source connected to said shielding arrangement for evacuating the aerosols from said aerosol containment chamber and providing for abatement of noise generated by the oscillation of said probe in said sample.

15. In an ultrasonic apparatus having a signal generator for generating high frequency sound waves to a convertor which transforms electrical energy into mechanical energy in the form of oscillations to a horn having a probe immersed in a sample disposed in a sample holder, the combination comprising:

a cabinet enclosing said convertor, said horn and said probe, said cabinet including an inner chamber lined with sound absorbing foam and having a front observation panel comprised of a layered plexiglass assembly for abatement of noise generated by the oscillation of said probe in said sample.

16. The combination of claim 15, wherein said layered plexiglass construction comprises three parallel layers of plexiglass, each layer being spaced equidistantly from an adjacent layer.

17. The combination of claim 15, wherein said cabinet is provided with a side access door.

18. The combination of claim 15, wherein each surface of said inner chamber with the exception of said front observation panel is provided with said sound absorbing foam.

19. In an ultrasonic apparatus for generating high frequency sound waves to a convertor which transforms electrical energy into mechanical energy in the form of oscillations to a horn having a probe immersed in a sample disposed in a sample container, the improvement comprising:

a shielding arrangement having one end sealed against said horn, and having another end sealed against and in sliding relationship with said sample container, said another end formed with a passageway having a longitudinal axis coincidental with the longitudinal axes of said sample container and said probe such that said another end defines a self centering device for said sample container as it slides in said another end.

20. The improvement of claim 19, wherein said shielding arrangement has an input port with a first disposable filter and an output port with a second disposable filter.

21. The improvement of claim 19, wherein said shielding arrangement comprises a threaded adapter having an upper end sealed against said convertor and a lower end surrounding said horn, a first adapter having an upper end connected to said lower end of said threaded adapter and a lower end having a flange, a spacer having an upper end frictionally fit within said flange and a lower end, a second adapter having an upper end frictionally fit to said lower end of said spacer and a lower end, and a sample holder having an upper end connected to the lower end of said second adapter and a lower end formed with said passageway, said first adapter and said second adapter being retained on either end of said spacer by springs extending between said lower end of said first adapter and said upper end of said second adapter.

* * * * *

UNITED STATES PATENT AND TRADEMARK OFFICE
CERTIFICATE OF CORRECTION

PATENT NO. : 5,484,202
DATED : January 16, 1996
INVENTOR(S) : Glenn R. Gourley et al It is certified that error appears in the above-indentified patent and that said Letters Patent is hereby corrected as shown below:

Column 1, line 5, after the title, add the following:

--- This invention was made with United States Government support awarded by NIH, Grant Nos. HD29287 and HD28619. The United States Government has certain rights in this invention. ---

Signed and Sealed this

Thirtieth Day of April, 1996

Attest:

BRUCE LEHMAN

Attesting Officer    Commissioner of Patents and Trademarks